United States Patent Office 3,647,871
Patented Mar. 7, 1972

3,647,871
PROCESS FOR PRODUCING ACETYLCHLORIDE
Herbert Eck, Hans Schwarzbauer, and Hellmuth Spes, Burghausen, Upper Bavaria, Germany, assignors to Wacker-Chemie G.m.b.H., Munich, Bavaria, Germany
No Drawing. Filed Apr. 2, 1969, Ser. No. 812,902
Claims priority, application Germany, Apr. 10, 1968,
P 17 68 186.6
Int. Cl. C07c 51/58
U.S. Cl. 260—544 Y    3 Claims

ABSTRACT OF THE DISCLOSURE

Process for producing acetylchloride which comprises reacting ketone and hydrogen chloride in acetylchloride.

BACKGROUND OF THE INVENTION

It is known that hydrogen chloride develops thermally in ketone into acetylchloride. In such case the reaction is performed in a heterogeneous neutral solvent at low temperatures (H. Staudinger "The Ketene," 912, Stuttgart). This method, however, has the disadvantage that the fractionation required for the purification process is rather costly. Furthermore, no maximal yields have been achieved.

On the other hand, quantitative yields have been achieved in practice when ketene and hydrogen chloride are passed over activated carbon or silica gel at 100° C. or at even higher temperatures (DRP No. 638,441). But then, when one works with hydrogen chloride at high temperatures, he runs up against the all too-familiar corrosion problems that are particularly hazardous in the presence of the extremely poisonous ketene.

SUMMARY OF THE INVENTION

We have now discovered a process for manufacturing acetylchloride from ketene and hydrogen chloride which avoids the above drawbacks and has no need for either surface-active materials or any other catalysts. Our process is characterized by transforming ketene and hydrogen chloride in the reaction product.

The process of the invention eliminates the need for the costly separation of the used solvents, for instance distillation.

The conversion with regard to ketene as well as hydrogen chloride proceeds in a practical and quantitative manner. Thus free hydrogen chloride enters the reactor only through the supply line. Furthermore, when working with an excess of hydrogen chloride, which is advantageous in the circulation, same comes in contact with the equipment at a relative low temperature.

DESCRIPTION OF THE PREFERRED EMBODIMENTS

Although the process is feasible at very low temperatures, for reasons of economy the usually preferred temperatures are those between 0° C. and the boiling point of acetylchloride, i.e. 51° C. The process of the invention also makes it possible to utilize the heat of the reaction released by the conversion for the distillation of the reaction product. Consequently, it is possible to obtain in the course of an operation pure acetylchloride in a practically quantitative output.

The process is performed in the following manner:

In the course of a discontinuous working process, ketene and hydrogen chloride are simultaneously introduced into the usual apparatus, a retort or a flask, which is designed to collect the acetylchloride. The quantities generally used are molar quantities in respect to ketene and hydrogen chloride with possibly a slight excess of hydrogen chloride, but of no more than 30% in relation to ketene.

The process can be performed successfully under normal pressure. Moreover, it is also possible to work under reduced or elevated pressures.

As mentioned, it is recommended to maintain the temperature between 0° C. and the boiling point of acetylchloride.

It has also been proven of value to direct the exhaust gases (not the converted hydrogen chloride, ketene, and the split products of ketene) through a second reaction container, for instance a tower, where a subsequent reaction leading to acetylchloride may be made to occur, and finally through a cooler and separator.

When the process is performed continuously, the devices are equipped with overflows through which the acetylchloride is discharged as it is being formed. In case the utilization of the reaction heat is desirable for distilling purposes, the reaction can then be guided through a distilling vessel and the product distilled continuousy as formed.

There are a number of devices that can be used just as well as reaction vessels, i.e. reaction pipes, towers, or circulation devices like liquid ring pumps where the reaction mixture is repumped.

The acetylchloride end product can be utilized in the known manner for acetylation and chlorination purposes.

Example 1

In the course of a continuous operation ketene and hydrogen chloride were conducted in a fritting tower provided with an outlet, at a temperature of 0° C. Acetylchloride served as the reaction medium. At a temperature of 26° C. the exhaust gases flowed through a second frit tower of identical construction and also supplied with acetylchloride, then through an intensive cooler and finally through a refrigerator valve. The throughput was 1 mol per hour.

The reaction product was purified by distillation. Yield: 99.0% in relation to ketene and to hydrogen chloride.

Example 2

Ketene and hydrogen chloride were fed continuously (1 mol per hour) into boiling acetylchloride placed in a frit tower provided with a fractionation column. The acetylchloride was distilled as it was formed. No additional supply of heat was needed to complete the distillation. The exhaust gases flowed through a refrigerator valve. The output in pure acetylchloride, in relation to ketene and hydrogen chloride, amounted to more than 98%.

The invention claimed is:
1. Process for producing acetylchloride which consists of reacting ketene and hydrogen chloride in acetylchloride.
2. Process according to claim 1, in which the reaction is performed in the liquid phase at a temperature of 0° C. to 51° C.
3. Process according to claim 1, in which the heat produced by the reaction is utilized to distil the reaction product.

References Cited

FOREIGN PATENTS 951,810  11/1956  Germany _____ 260—544

OTHER REFERENCES

Chemical Abstracts., vol. 51, p. 5819i–5820a (B. A. Porai-Koshits et al.), 1956.

LORRAINE A. WEINBERGER, Primary Examiner
E. J. GLEIMAN, Assistant Examiner